US010295082B2

(12) United States Patent
Routeau

(10) Patent No.: US 10,295,082 B2
(45) Date of Patent: May 21, 2019

(54) METHOD FOR MOUNTING AN UNDERSEA INSTALLATION COMPRISING AT LEAST ONE SECTION OF PIPE, AND ASSOCIATED INSTALLATION

(71) Applicant: TECHNIP FRANCE, Courbevoie (FR)

(72) Inventor: Sylvain Routeau, Saint Cloud (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/536,164

(22) PCT Filed: Dec. 16, 2015

(86) PCT No.: PCT/EP2015/080007
§ 371 (c)(1),
(2) Date: Jul. 19, 2017

(87) PCT Pub. No.: WO2016/096994
PCT Pub. Date: Jun. 23, 2016

(65) Prior Publication Data
US 2017/0350536 A1  Dec. 7, 2017

(30) Foreign Application Priority Data
Dec. 16, 2014 (FR) ...................................... 14 62498

(51) Int. Cl.
*F16L 1/16* (2006.01)
*F16L 3/18* (2006.01)
(Continued)

(52) U.S. Cl.
CPC ................ *F16L 1/16* (2013.01); *E02D 27/52* (2013.01); *F16L 1/20* (2013.01); *F16L 1/235* (2013.01);
(Continued)

(58) Field of Classification Search
CPC .... E02D 27/52; F16L 1/16; F16L 1/20; F16L 1/235; F16L 1/26; F16L 3/18
(Continued)

(56) References Cited

U.S. PATENT DOCUMENTS 3,713,275 A * 1/1973 Hyatt ...................... B63B 35/03
138/111
5,518,340 A * 5/1996 Hall .......................... F16L 1/00
138/97
(Continued)

FOREIGN PATENT DOCUMENTS

FR          3 003 622 A1      9/2014

OTHER PUBLICATIONS

International Search Report dated Mar. 10, 2016 in corresponding PCT International Application No. PCT/EP2015/080007.
(Continued)

*Primary Examiner* — Frederick L Lagman
(74) *Attorney, Agent, or Firm* — Ostrolenk Faber LLP

(57) ABSTRACT

A method has the following steps: a) providing an undersea foundation arranged on the bed of a body of water; b) laying a section of pipe and of an in-line structure on the foundation and allowing the section of pipe to freely self-orient on the foundation; c) placing at least one guide on the foundation on both sides of the section of pipe; d) blocking the guide on the foundation to laterally clamp the section of pipe with respect to the foundation, while authorizing a longitudinal movement of the section of pipe with respect to the guide.

13 Claims, 6 Drawing Sheets

(51) Int. Cl.
*E02D 27/52* (2006.01)
*F16L 1/235* (2006.01)
*F16L 1/20* (2006.01)
*B63B 35/03* (2006.01)
*E21B 41/00* (2006.01)
*E21B 43/01* (2006.01)
*F16L 1/18* (2006.01)

(52) U.S. Cl.
CPC ............... *F16L 3/18* (2013.01); *B63B 35/03* (2013.01); *E02D 27/525* (2013.01); *E02D 2200/1685* (2013.01); *E21B 41/0007* (2013.01); *E21B 43/01* (2013.01); *F16L 1/161* (2013.01); *F16L 1/18* (2013.01)

(58) Field of Classification Search
USPC .............................................. 405/184.4, 172
See application file for complete search history.

(56) References Cited

U.S. PATENT DOCUMENTS

| | | | | |
|---|---|---|---|---|
| 6,004,072 | A * | 12/1999 | Cunningham | F16L 41/06 166/343 |
| 6,290,431 | B1 * | 9/2001 | Exley | F16L 1/26 137/317 |
| 6,290,432 | B1 * | 9/2001 | Exley | B08B 9/023 137/317 |
| 8,425,154 | B1 * | 4/2013 | Lugo | F16L 1/26 166/347 |
| 8,449,221 | B1 * | 5/2013 | Lugo | F16L 1/26 405/169 |
| 8,628,272 | B2 * | 1/2014 | Alliot | F16L 1/26 405/158 |
| 8,936,413 | B2 * | 1/2015 | Mille | F16L 1/18 405/169 |
| 2007/0269270 | A1 * | 11/2007 | Bastesen | F16L 1/20 405/170 |
| 2008/0152433 | A1 * | 6/2008 | Monti | F16L 1/16 405/184.4 |
| 2011/0150576 | A1 * | 6/2011 | Alliot | F16L 1/16 405/169 |
| 2012/0263541 | A1 | 10/2012 | Lillejordet et al. | 405/170 |
| 2014/0105688 | A1 * | 4/2014 | Bastesen | F16L 1/20 405/169 |
| 2016/0169414 | A1 * | 6/2016 | Ayestaran Basagoitia | F16L 1/123 405/159 |

OTHER PUBLICATIONS

Written Opinion dated Mar. 10, 2016 in corresponding PCT International Application No. PCT/EP2015/080007.
French Preliminary Search Report dated Aug. 5, 2015 in corresponding French Patent Application No. 1462498.

* cited by examiner

METHOD FOR MOUNTING AN UNDERSEA INSTALLATION COMPRISING AT LEAST ONE SECTION OF PIPE, AND ASSOCIATED INSTALLATION

CROSS-REFERENCE TO RELATED APPLICATIONS

The present application is a 35 U.S.C. §§ 371 national phase conversion of PCT/EP2015/080007, filed Dec. 16, 2015, which claims priority of French Patent Application No. 14 62498, filed Dec. 16, 2014, the contents of which are incorporated by reference herein. The PCT International Application was published in the French language.

TECHNICAL FIELD

The present invention relates to a method for mounting an undersea installation comprising at least one in-line structure secured to a section of pipe, the method including the following steps:
providing an undersea foundation arranged on the bed of a body of water;
laying a section of pipe and of an in-line structure on the foundation and allowing the section of pipe to freely self-orient on the foundation.

TECHNICAL BACKGROUND

This method is intended for mounting installations in particular comprising a fluid transport pipe and an in-line structure deployed along the pipe.

An "in-line structure" refers to structures or equipment attached or connected to at least one section of pipe so as to form a secured assembly that is installed together by a placement vessel. The in-line structure is most often connected to the pipe on board the placement vessel and is next deposited in line over the course of mounting of the pipe.

The fluid transport pipe is preferably a rigid pipe made from an assembly of metal tubes and intended for undersea hydrocarbon extraction.

In undersea installations, it is known to deploy, along the pipe, in-line structures including connection or flow rate monitoring functionalities, such as valves, wellheads, T-connections, etc.

These in-line structures are for example pipeline end termination (PLET) or flow line terminal assembly (FTA) structure, for in-line T-connections (ILT for "inline tee"; ITA for "inline tee assembly").

The in-line structures are sometimes bulky and heavy. Furthermore, in some cases, the ground on which the installation is placed is movable and unstable.

To ensure proper positioning of the installation, it is then necessary to first place a foundation on the bottom of the body of water, then to deposit the in-line structure and the sections of pipe connected to the in-line structure on the foundation using a traditional placement technique, for example J or S or using the so-called reeled pipe technique, well known by those skilled in the art.

In the case of a rigid pipe, the positioning of the in-line structure on the foundation may prove tedious. It is in fact necessary to target the foundation when lowering the in-line structure to ensure that the in-line structure indeed rests on the foundation.

The in-line structure, and the rigid pipe sections connected to the in-line structure, can then be placed without guidance, while being free to move.

Furthermore, uncontrolled movements of the in-line structure can occur during the operation of the field, due to thermal constraints applied to the pipe, which may move it away from the foundation.

Such a solution is often difficult to carry out in practice or creates excess costs for the installation project. Indeed, such placement then requires increasing the dimensions of the foundation to offset the unknowns of the placement.

To offset this problem, permanent guides are installed on the foundation, before positioning the rigid pipe and the in-line structure thereon. These guides define a positioning axis of the rigid pipe on the foundation.

Such a solution is not fully satisfactory, since it requires very precise alignment of the pipe with the positioning axis during placement of the structure, in order to insert the section(s) of pipe in the guides. This considerably complicates the placement operations.

Furthermore, placement may cause new stresses that are applied on the sections of pipe, for example creating twisting that may prove harmful to the lifetime of the pipe.

SUMMARY OF INVENTION

One aim of the invention is therefore to obtain a method for placing an undersea installation that provides good support for the installation, even on moving ground, and which nevertheless remains easy to carry out.

To that end, the invention relates to a method of the aforementioned type, comprising the following steps:
placing at least one guide on the foundation on both sides of the section of pipe;
blocking the guide on the foundation to laterally clamp the section of pipe with respect to the foundation, while authorizing a longitudinal movement of the section of pipe with respect to the guide.

According to specific embodiments, the process according to the invention comprises one or more of the following features, considered alone or according to any technically possible combination(s):
the step for placing the guide includes positioning a first lateral stop on one side of the section of pipe and positioning a second lateral stop on a second side of the section of pipe, the section of pipe being laterally clamped between the first lateral stop and the second lateral stop.
the step for blocking the guide includes locking the first lateral stop and the second lateral stop in position relative to the foundation.
the step for placing the guide includes clamping at least one intermediate stop positioned between the first lateral stop and the second lateral stop on an upper bearing surface connected to the section of pipe.
the section of pipe has a protective cap, advantageously cylindrical, the intermediate stop being clamped on the cap.
the guide includes a support mounted on the foundation, each lateral stop being moved vertically in the support between an upper placement position of the section of pipe and a lower clamping position of the section of pipe.
the local angular configuration of the section of pipe relative to an axis of the foundation after placement of the guide corresponds to the local angular configuration of the section of pipe before the placement of the guide.
the method comprises, after the step for placing the section of pipe on the foundation, placing at least one additional guide on the foundation on either side of the section of pipe and blocking the additional guide to clamp the section of pipe relative to the foundation, while allowing a longitudinal movement of the section of pipe relative to the guide, the additional guide being spaced axially away from the guide along the pipe.

the in-line structure bears on the foundation during the placement step of the section of pipe on the foundation.

the guide comprises a plurality of stops forming a comb.

The invention also relates to an undersea installation, including:

an undersea foundation arranged on the bed of a body of water;

at least one section of pipe and an in-line structure that are positioned opposite the undersea foundation;

characterized in that the installation includes at least one guide mounted on the foundation on either side of the section of pipe to laterally block the section of pipe with respect to the foundation, while authorizing a longitudinal movement of the section of pipe with respect to the guide, the guide being able to be placed after the placement of the section of pipe on the foundation.

According to specific embodiments, the installation according to the invention comprises one or more of the following features, considered alone or according to any technically possible combination(s):

the guide includes a first lateral stop positioned on one side of the section of pipe and a second lateral stop positioned on a second side of the section of pipe, the section of pipe being laterally clamped between the first lateral stop and the second lateral stop.

the guide includes at least one intermediate stop clamped between the first lateral stop and the second lateral stop on an upper bearing surface connected to the section of pipe.

the section of pipe has a protective cap, advantageously cylindrical, the intermediate stop being clamped on the cap.

the guide includes a support mounted on the foundation, each lateral stop being movable vertically in the support between an upper placement position of the section of pipe and a lower clamping position of the section of pipe.

the in-line structure bears on the foundation.

the guide comprises a plurality of stops forming a comb.

BRIEF DESCRIPTION OF THE DRAWINGS

The invention will be better understood upon reading the following description, provided solely as an example, and in reference to the appended drawings, in which.

DESCRIPTION OF EMBODIMENTS

Figure 1:
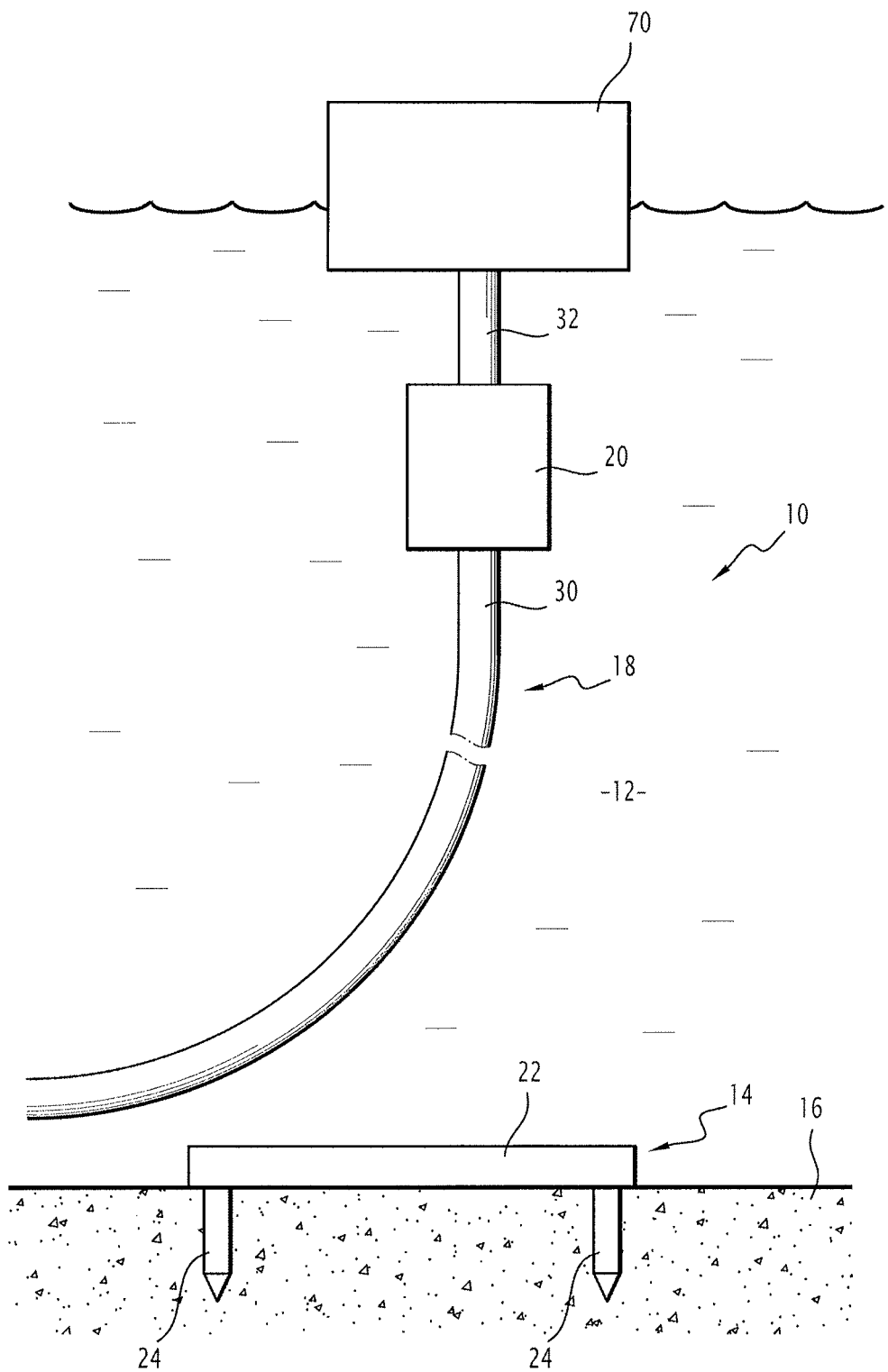
FIG. 1 is a schematic side view of a first installation according to the invention during a step for lowering the in-line structure and the rigid pipe on which the in-line structure is mounted.
Figure 2:
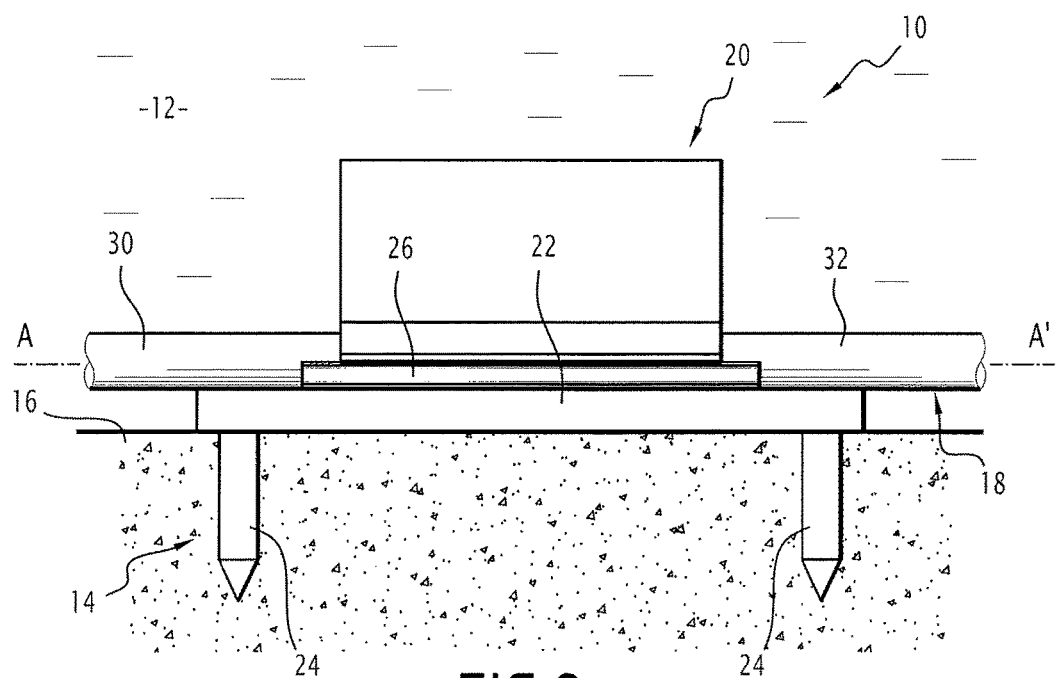
FIG. 2 is a side view of the installation according to the invention, during a step for placing the in-line structure and the rigid pipe on a foundation at the bottom of the body of water.

A first undersea installation 10 according to the invention is successively illustrated by FIGS. 1 to 6.

This installation 10 is in particular intended to collect and convey a fluid at the bottom of a body of water 12, for example to bring it up toward the surface. The fluid is in particular a fluid containing hydrocarbons, such as oil or natural gas.

The body of water 12 is for example a sea, ocean, lake or river. The depth of the body of water 12 at the installation 10 is for example comprised between 5 m and 3000 m, and even beyond.

The installation 10 includes a foundation 14, placed on the bottom 16 of the body of water 12, at least one fluid transport pipe 18, and advantageously, at least one in-line structure 20 supported by the pipe 18 and intended to rest on the foundation 14.

Figure 5:
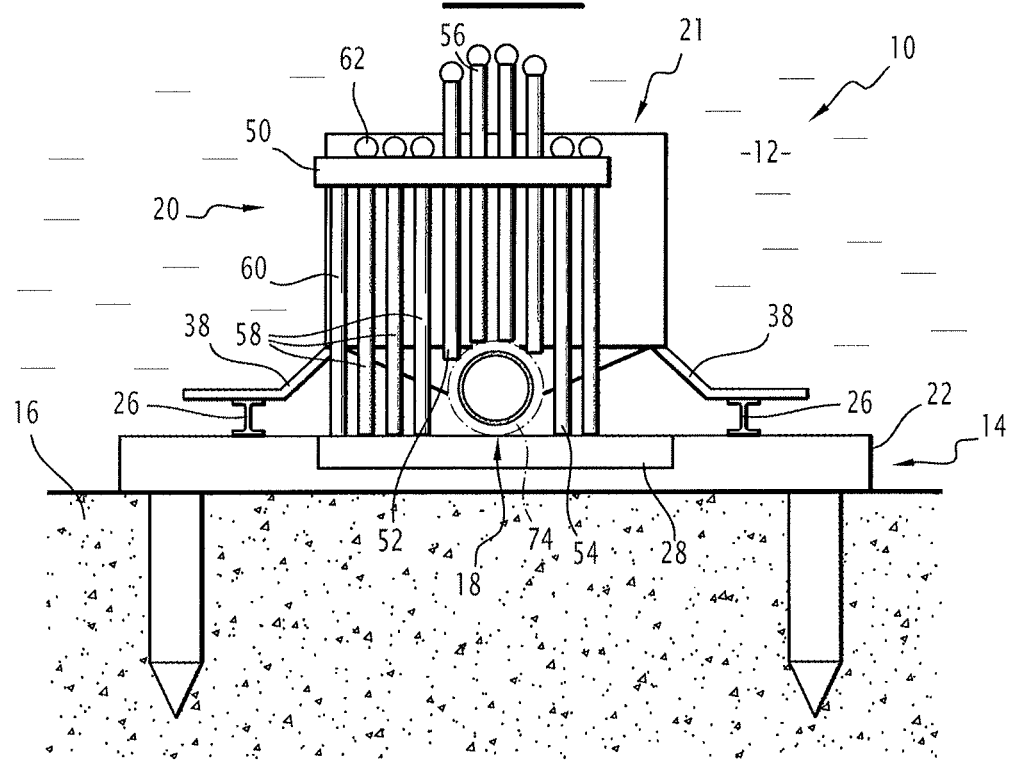
FIG. 5 is a view similar to FIG. 3, during a placement step of a guide.

According to the invention, the installation 10 includes at least one guide 21, shown for example in FIG. 5, able to laterally block a section of pipe 18 with respect to the foundation 14, while allowing a longitudinal movement of the section of pipe in the guide 21.

According to the invention, each guide 21 is able to be placed after the pipe 18 and the structure 20 have been brought in and placed on the foundation 14.

The foundation 14 is intended to support and stabilize at least part of the pipe 18, and the in-line structure 20, in particular when the bottom 16 of the body of water 12 is unstable and/or movable.

The foundation 14 includes a support plate 22, intended to extend at least partially above the bottom 16 of the body of water 12. It advantageously includes anchoring legs 24 in the bottom 16 of the body of water 12. Here, it includes longitudinal beams 26 bearing on the in-line structure 20, and transverse crosspieces 28 supporting sections of the pipe 18.

The anchoring legs 24 protrude from the plate 22 in the bottom 16 of the body of water 12.

The beams 26 here extend parallel to an axis A-A' of the foundation 14, on either side of this axis A-A'. The crosspieces 28 extend perpendicular to the axis A-A', near the longitudinal ends of the foundation 14.

The pipe 18 is a rigid pipe. It is formed by an assembly of metal tubes. The tubes are for example assembled by surface welding, before lowering the pipe 18 into the body of water 12.

Figure 3:
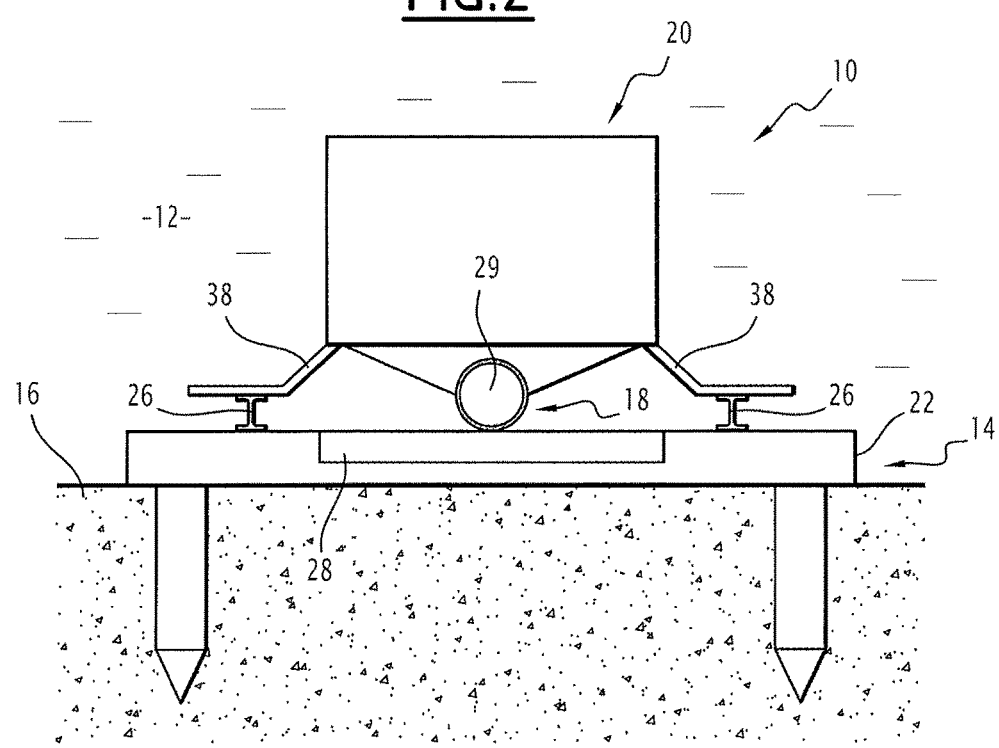
FIG. 3 is a front view of the installation during the placement step.

The pipe 18 inwardly defines a fluid circulation passage 29, visible in FIG. 3.

In this example, the pipe 18 includes at least a first section 30 protruding longitudinally from a first side of the in-line structure 20, and advantageously, at least a second section 32 protruding longitudinally from a second side of the in-line structure 20 opposite the first section 30, at least one of said sections being connected to the in-line structure 20 during placement.

According to the invention, the structure 20 can be a pipeline end termination (PLET), i.e., a piece of equipment connected to the pipe 18 only on one side by a single section 28, and therefore placed in line at the end of the pipe.

In the example shown in the figures, the structure 20 is connected in line to the pipe 18 via two sections 30, 32.

The first section 30 is intended to bear on a first crosspiece 28 and the second section 32 is intended to bear on a second crosspiece 28.

The in-line structure 20 is for example chosen from among a pipeline end termination (PLET) or flow line terminal assembly (FTA) structure, an in-line T-connections (ILT for "inline tee"; ITA for "inline tee assembly").

It for example includes functional elements, such as pipes, flow rate control members, in particular valves, fluid collectors, terminal equipment, gas lift injection connections. An in-line structure 20 is not a simple section of pipe.

In the example shown in FIG. 3, the in-line structure 20 includes a core 36 bearing the functional elements, feet 38 bearing on the foundation 14, intended to be placed on the beams 26.

Figure 4:
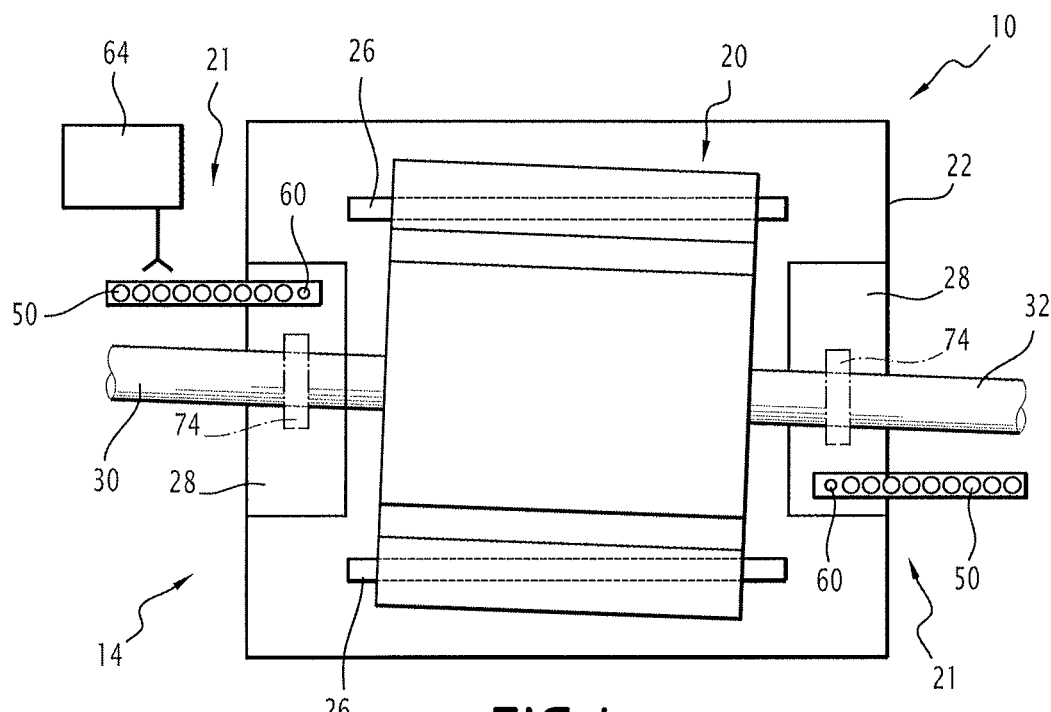
FIG. 4 is a top view of the installation, during the placement step.
Figure 6:
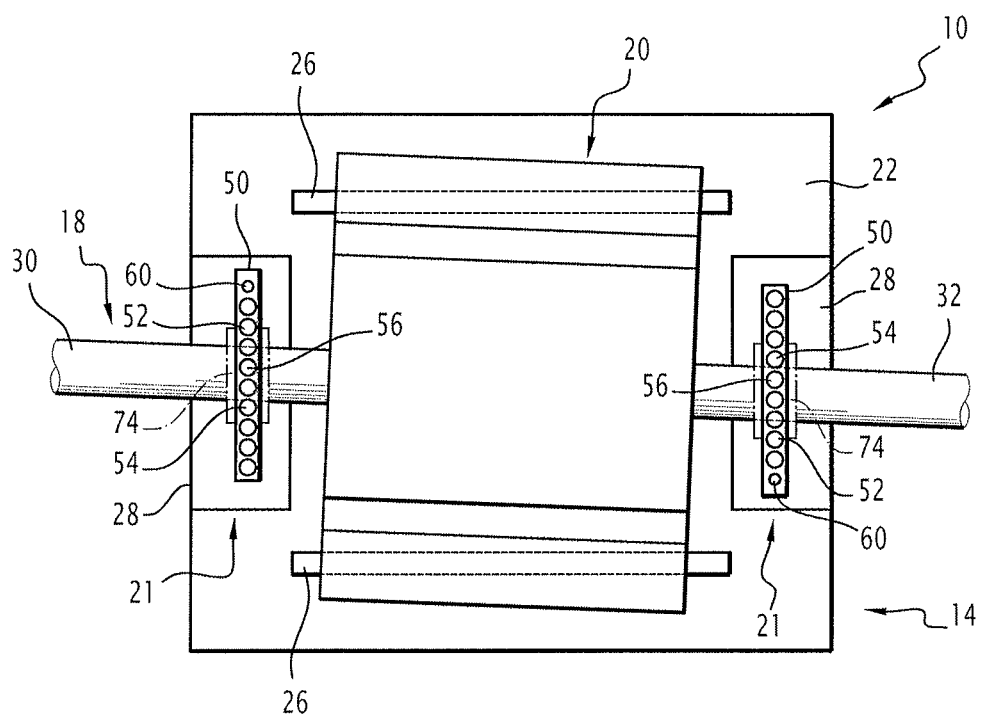
FIG. 6 is a view similar to FIG. 4, during a placement step of a guide.

As illustrated by FIGS. 4 and 6, the installation 10 includes at least a first guide 21 intended to guide the first section 30. It may also include an additional guide 21 intended to guide the second section 32.

The guides 21 are positioned on either side of the foundation 14 near its longitudinal ends.

In reference to FIG. 5, each guide 21 includes a support 50, and a plurality of moving stops, comprising a first lateral stop 52, intended to clamp a first side of the section 30, 32, and a second lateral stop 54, intended to clamp a second side of the section 30, 32.

In the example shown in FIG. 5, each guide 21 further includes at least one intermediate stop 56, positioned between the stops 52, 54 and intended to bear on an upper surface of the section 30, 32.

The guide 21 more generally includes a plurality of parallel stops 58, spaced apart transversely with respect to the axis A-A'. The stops 52 to 58 form a comb, intended to accommodate various transfers positions of the section 30, 32 relative to the axis A-A'.

The distance laterally separating two adjacent stops 52 to 58 is for example comprised between 20 mm and 80 mm.

In this example, the guide 21 further includes a mechanism 60 for joint movement of the support 50 and the stops 52 to 58, between a retracted placement position of the pipe 18, shown in FIG. 4, and an active clamping position of a section 30, 32, shown in FIG. 6.

The guide 21 further includes a mechanism (not shown) for blocking each stop 52 to 58 in position.

The support 50 extends above the cross-piece 28, substantially parallel to an upper surface of the cross-piece 28 on which the section 30, 32 bears, in the active position.

The stops 52, 54, 56, 58 are mounted movable in vertical translation in the support 50, between an upper placement position of the section 30, 32, and a lower insertion position in the cross-piece 28.

In the upper position, the lower end of the stop 52 to 58 is positioned above and separated from the cross-piece 28, at a distance at least greater than the diameter of the section 30, 32.

In the lower position, the lower end of the stop 52 to 58 is inserted in an orifice arranged in the cross-piece 28.

Each stop 52 to 58 is provided with a maneuvering member 62, able to be grasped by a diver or a remotely operated vehicle 64 (ROV). The maneuvering member 62 is for example formed by a monkey fist.

The blocking mechanism is able to block each stop 52 to 58 in its upper position and to be released by a diver or by the remotely operated vehicle 64.

In the example shown in FIG. 4, the movement mechanism 60 is able to pivot the support 50 and stops 52 to 58 around a vertical axis relative to the foundation 14, between the retracted position, in which the support 50 extends substantially axially relative to the axis A-A', and the active position, in which the support 50 extends substantially transversely relative to the axis A-A'.

The method for placing the installation 10 according to the invention will now be described. This method is carried out using a placement assembly 70, visible in FIG. 1.

The placement assembly 70 is positioned on the surface of the body of water. It preferably floats. It for example includes traditional J or S placement means.

Initially, the foundation 14 is provided and is placed on the bottom 16 of the body of water 12. The legs 24 are fastened in the bottom 16 of the body of water 12. The plate 22 advantageously extends above the bottom 16.

The guides 21 are arranged in the retracted position. The stops 52 to 58 occupy their upper position and are kept in position by the blocking mechanism.

The placement assembly 70 gradually lowers the first section 30 of the pipe 18.

Then, the in-line structure 20 is assembled on the pipe 18 on the surface. The in-line structure 20 is lowered into the body of water 12 while being suspended from a second section 32 of the pipe 18.

The sections 30, 32 and the in-line structure 20 are then placed on the foundation 14 with very broad positioning allowances.

In particular, the sections 30, 32 of pipe 18 and the in-line structure 20 are placed freely on the foundation 14, in the natural position and orientation that they occupy at the end of being lowered. They are freely angularly and transversely oriented relative to the axis A-A' of the foundation 14.

No guide is in place during the bearing of the sections 30, 32 and/or the in-line structure 20 on the foundation 14.

This positioning of the pipe 18 and the in-line structure 20 is therefore simple to perform from the surface, since it suffices simply to target bearing on the foundation 14, without having to obtain a very precise orientation of the sections 30, 32 and/or the in-line structure 20 relative to the axis A-A' of the foundation 14.

Next, once the in-line structure 20 and the pipe 18 are placed bearing stably on the foundation 14, each guide 21 is maneuvered by a diver or by a remotely operated vehicle 64 to place it in the active position.

As illustrated by FIG. 6, the support 50 then orients itself substantially transversely with respect to the section 30, 32.

Then, the first stop 52 situated closest to a first side of the section 30, 32 is moved from its upper position to its lower position to clamp the first side of the section 30, 32 in the angular orientation that it occupies after placement of the section 30, 32 on the foundation 14.

Likewise, the second stop 54 situated closest to a second side of the section 30, 32 is movable from its upper position to its lower position to clamp the second side of the section 30, 32 in the same angular orientation.

No movement or stressing of the section 30, 32 is necessary to laterally clamp the section 30, 32 in position, irrespective of its angular orientation. This ensures the maintenance in position of the pipe 18, with a very simple placement.

Advantageously, the local angular configuration of the section of pipe 30, 32 relative to an axis A-A' of the foundation 14 after placement of the guide 21 corresponds to the local angular configuration of the section of pipe 30, 32 before the placement of the guide 21.

Furthermore, the sections 30, 32 of the pipe remain free to translate between the stops 52, 54 to allow a potential adjustment in position and any release of pre-existing stresses.

The intermediate stop 56 is also lowered toward its lower position, and bears in an intermediate position against the upper surface of the section 30, 32.

Then, the other stops 58 are lowered into their lower position.

The placement method is therefore particularly easy to carry out, since it does not require precise guiding of the assembly formed by the pipe 18 and the in-line structure 20 on the foundation 14.

Nevertheless, the placement method ensures very effective lateral clamping of the sections 30, 32 of the pipe 18 while leaving the possibility of axial movement. In one alternative, at least one section 30, 32 is equipped with a protective cap 74 able to come into contact with the intermediate stop 56 to protect the outer surface of the pipe 18.

Figure 7:
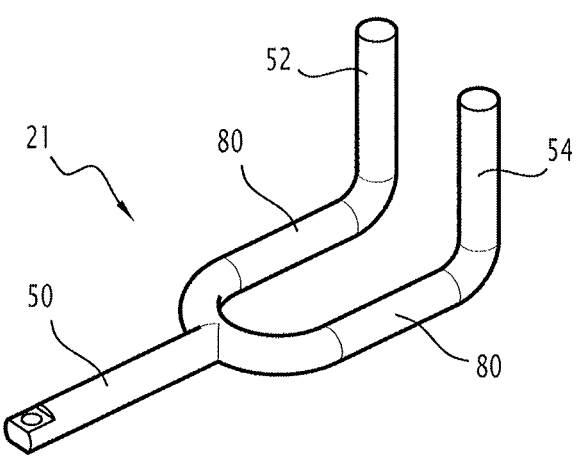
FIG. 7 is a three-quarters front perspective view of an alternative guide for a second installation according to the invention.
Figure 8:
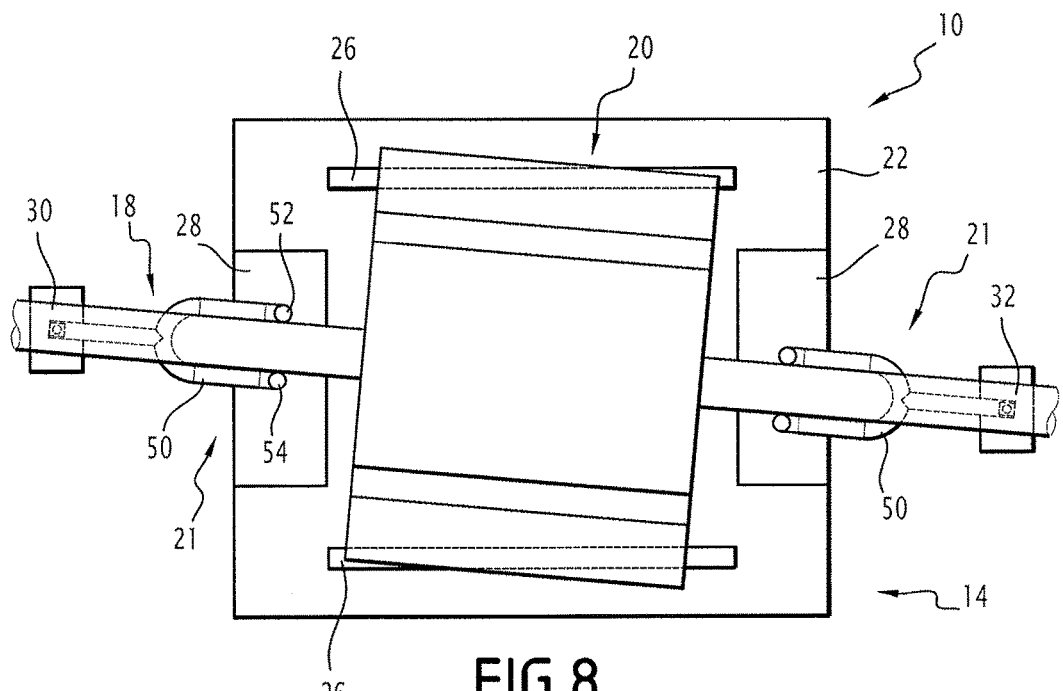
FIG. 8 is a view similar to FIG. 6 of the second installation according to the invention.

In the alternative shown in FIGS. 7 and 8, each guide 21 includes a fork-shaped support 50 having two parallel fingers 80 respectively bearing a stop 52, 54.

The supports 50 are mounted pivoting at least around a vertical axis relative to the foundation 14.

Each guide 21 includes a mechanism for blocking the support 50 in position, able to be activated after placing the section 30, 32.

The method for placing the installation 10 shown in FIG. 8 differs from that shown in FIGS. 1 to 6 in that the supports 50 are initially retracted. They are next placed below each section 30, 32, after placement of the pipe 18 and the in-line structure on the foundation 14, to clamp the section 30, 32 in the angular orientation that it occupies, while arranging the stops 52, 54 on either side of the section 30, 32.

Then, the supports 50 are angularly blocked by the blocking mechanism.

According to one alternative of the invention, the comb is situated in its retracted position inside the foundation 14 so as to protrude below the plane of the foundation on which the structure 20 bears. According to this alternative, the stops 52 to 54 are then pulled upward by a mechanism controlled manually (diver) or automatically by a vehicle of the ROV, AUV type, with the exception of the stops that are blocked in translation by the section of pipe 32, 34. As a result, the lateral stops 52 and 54 become placed around the pipe section.

Figure 9:
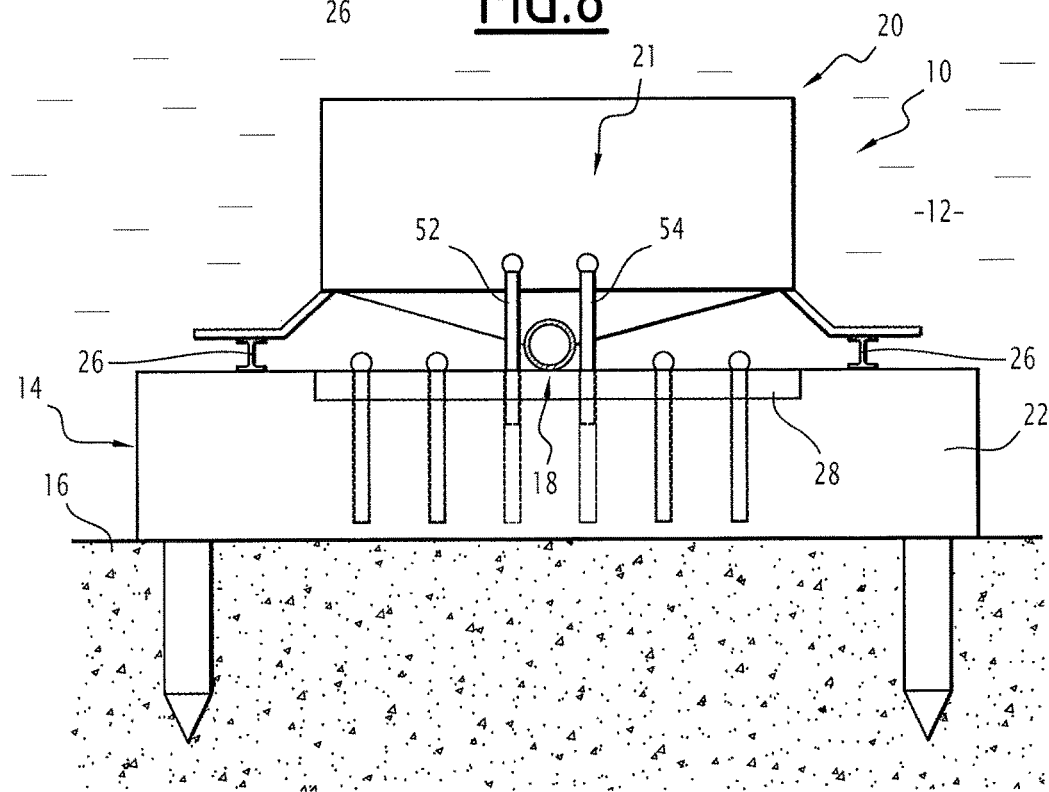
FIG. 9 is a view similar to FIG. 3 of a third installation according to the invention.

In the alternative shown in FIG. 9, the guide 21 has no support 50. The stops 52 to 58 are initially in a lower position retracted in the foundation 14, for example through the cross-piece 28.

The pipe 18 is placed on the foundation 14, as previously indicated, allowing it to adopt the desired configuration.

Then, a first lateral stop 52 situated closest to a first side of each section 30, 32 is raised into a deployed upper position. A second lateral stop 54 situated closest to a second side of the section 30, 32 is also raised into a deployed upper position.

Each section 30, 32 is then laterally clamped between the lateral stops 52, 54.

Figure 10:
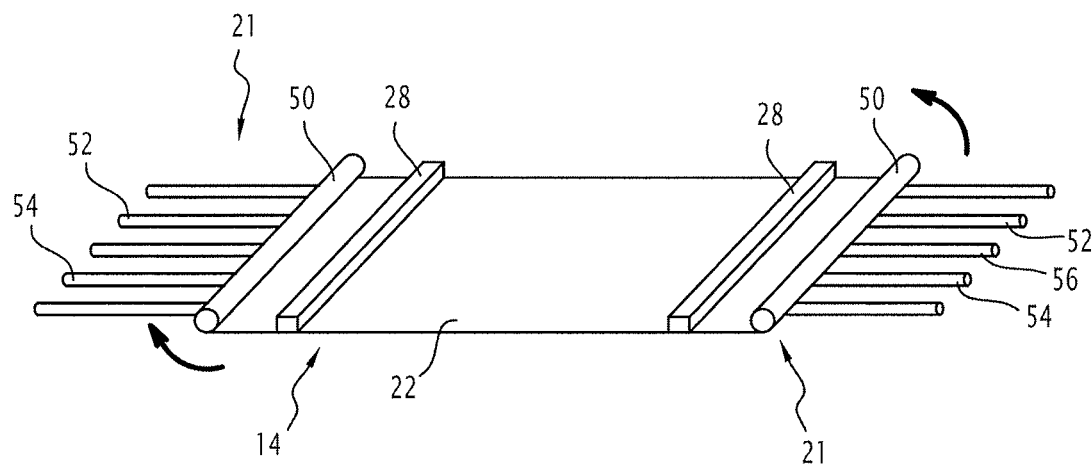
FIG. 10 is a partial perspective view of a fourth installation according to the invention.

In an alternative shown in FIG. 10, the movement of the support 50 of the stops 52 to 54 is done following a quarter-revolution around a horizontal axis, between a flat position shown in FIG. 10, in which the stops 52 to 54 are flat, and a vertical protruding position, in which at least two stops 52, 54 protrude vertically. Each end of the foundation 14 is advantageously provided with a comb of stops 52 to 56.

The 90° rotation of the support 50 clamps each respective section of pipe 30, 32 between its stops 52, 54. Some stops 56 remain blocked in their horizontal position by a section of pipe 30, 32 during the rotation.

The invention claimed is:

1. A method for mounting an undersea installation including at least one in-line structure secured to a section of pipe, comprising:
   providing an undersea foundation arranged on a bed of a body of water;
   laying the in-line structure and the section of pipe on the foundation while allowing the in-line structure and the section of pipe to freely self-orient on the foundation;
   placing at least one guide on the foundation on both sides of the section of pipe;
   setting the guide on the foundation to laterally clamp the section of pipe with respect to the foundation, while authorizing a longitudinal movement of the section of pipe with respect to the guide.

2. The method according to claim 1, wherein the placing of the at least one guide includes positioning a first lateral stop on one lateral side of the section of pipe and positioning a second lateral stop on a second lateral side of the section of pipe, and laterally clamping the section of pipe between the first lateral stop and the second lateral stop.

3. The method according to claim 2, wherein the blocking of the at least one guide includes locking the first lateral stop and the second lateral stop in position relative to the foundation.

4. The method according to claim 2, wherein the placing of the at least one guide includes clamping at least one intermediate stop positioned between the first lateral stop and the second lateral stop and on an upper bearing surface of the section of pipe.

5. The method according to claim 2, wherein the at least one guide includes a support mounted on the foundation, each lateral stop being moved vertically in the support between an upper placement position of the section of pipe and a lower clamping position of the section of pipe.

6. The method according to claim 1, wherein after the placing of the at least one guide, a local angular configuration of the section of pipe relative to an axis of the foundation corresponds to a local angular configuration of the section of pipe before the placing of the at least one guide.

7. The method according to claim 1, comprising, after placing the section of pipe on the foundation, placing at least one additional guide on the foundation on either side of the section of pipe and setting the additional guide to clamp the section of pipe relative to the foundation, while allowing a longitudinal movement of the section of pipe relative to the guide, the additional guide being spaced axially away from the at least one guide along the pipe.

8. The method according to claim 7, wherein the in-line structure bears on the foundation during the placement of the section of pipe on the foundation.

9. An undersea installation comprising:
   an undersea foundation arranged on a bed of a body of water;
   at least one section of pipe and an in-line structure that are positioned on the undersea foundation;
   at least one guide mounted on the foundation on either side of the section of pipe at locations to laterally block the section of pipe with respect to the foundation, while authorizing a longitudinal movement of the section of pipe with respect to the at least one guide, the at least one guide being configured to be placed after the placing of the section of pipe on the foundation.

10. The installation according to claim 9, wherein the at least one guide includes a first lateral stop positioned on one lateral side of the section of pipe and a second lateral stop positioned on a second lateral side of the section of pipe, the section of pipe being laterally clamped between the first lateral stop and the second lateral stop.

11. The installation according to claim 10, wherein the at least one guide includes at least one intermediate stop clamped between the first lateral stop and the second lateral stop and on an upper bearing surface of the section of pipe.

12. The installation according to claim 10, wherein the at least one guide includes a support mounted on the foundation, each of the first and the second lateral stops being movable vertically in the support between an upper placement position of the section of pipe which permits placement of the section of the pipe on the support and a lower clamping position for clamping the section of pipe.

13. The installation according to claim 9, wherein the in-line structure bears on the foundation.

* * * * *